United States Patent

[11] 3,552,431

| [72] | Inventor | Albertus E. Schmidlin |
| | | Caldwell, N.J. |
| [21] | Appl. No. | 742,839 |
| [22] | Filed | July 5, 1968 |
| [45] | Patented | Jan. 5, 1971 |
| [73] | Assignee | Singer-General Precision, Inc. |
| | | a corporation of Delaware |

[54] FLUIDIC PRESSURE REGULATOR
2 Claims, 2 Drawing Figs.

[52] U.S. Cl. .................................................. 137/505.42, 137/530
[51] Int. Cl. ............................................... F16k 31/38
[50] Field of Search .......................................... 137/505.42, 505.41, 505.15; 92/103W, 102, 104

[56] References Cited
UNITED STATES PATENTS

| 2,672,891 | 3/1954 | Fausek | 92/102 |
| 2,812,777 | 11/1957 | Dahl | 92/102 |
| 1,330,402 | 2/1920 | Smith | 92/102X |
| 2,764,996 | 10/1956 | Brown | 137/505.42X |
| 2,816,561 | 12/1957 | Krueger | 137/505.42X |
| 3,139,900 | 7/1964 | Karing | 137/505.42X |
| 3,276,470 | 10/1966 | Griffing | 137/505.15 |
| 3,443,583 | 5/1969 | Webb | 137/505.41X |

*Primary Examiner*—Harold W. Weakley
*Attorneys*—S. A. Giarratana, G. B. Oujevolk and S. M. Bender ABSTRACT: A fluidic pressure regulator comprising a hollow housing having a diaphragm therein which forms a chamber through which fluid is passed. Means are provided for applying a load to the diaphragm in an opposite direction to the force exerted by the pressurized fluid on the diaphragm, which load varies in response to changes in the pressure of the fluid passing into the chamber.

PATENTED JAN 5 1971 3,552,431

INVENTOR
ALBERTUS E. SCHMIDLIN

BY S. A. Giarratana
ATTORNEY

FLUIDIC PRESSURE REGULATOR

BACKGROUND OF THE INVENTION

This invention relates to a device for regulating the pressure of a flowing fluid, and more particularly, to a device for receiving a flowing fluid which may be at varying pressures and effecting a constant pressure discharge of the fluid.

In the field of navigation guidance and control, it is frequently necessary to provide a device, such as a sensor or amplifier, with a controlled constant supply pressure, since these devices are sensitive to any changes in the latter.

Various types of regulators have been proposed, which generally include a valve member which is acted on by the load pressure of the fluid and which has a spring, or the like, exerting a force on the valve member in a direction opposite to that of the load pressure. However, in operation, these spring forces are normally substantially constant and are therefore insensitive to pressure changes in the supply fluid. As a result, the output pressure of the fluid will vary in response to changes in the supply pressure.

Also, these and other similar regulators contain several moving parts which, of course, make them sensitive to a very high accelerations such as in the order of 100 or 1,000 times gravity.

BRIEF SUMMARY OF THE INVENTION

It is, therefore, an object of the present invention to provide a fluidic pressure regulator which overcomes the above disadvantages by providing a relative low mass regulator with a minimum of moving parts which effects an output flow of fluid at a constant regulated pressure in response to an input flow of fluid at a varying pressure, and which is not sensitive to high accelerations, or the like.

Briefly summarized, the present invention consists of a housing forming a chamber having a fluid inlet and outlet, with a diaphragm having a predetermined flexural strength forming one surface of the chamber. A ball valve is associated with the inlet to the chamber and is operatively connected to the diaphragm, the latter being designed so that, as it moves to and from its loaded position, its flexure stresses and resulting forces vary proportionally to compensate for the changes in the pressure of the fluid flow through the inlet, which results in an output flow at a constant pressure.

BRIEF DESCRIPTION OF THE DRAWINGS

Reference is now made to the accompanying drawings for a better understanding of the nature and objects of the fluidic pressure regulator of the present invention, which drawings illustrate the best mode presently contemplated for carrying out the objects of the invention and its principles, and are not to be construed as restrictions or limitations on its scope. In the drawings.

DESCRIPTION OF THE PREFERRED EMBODIMENTS

Figure 1:
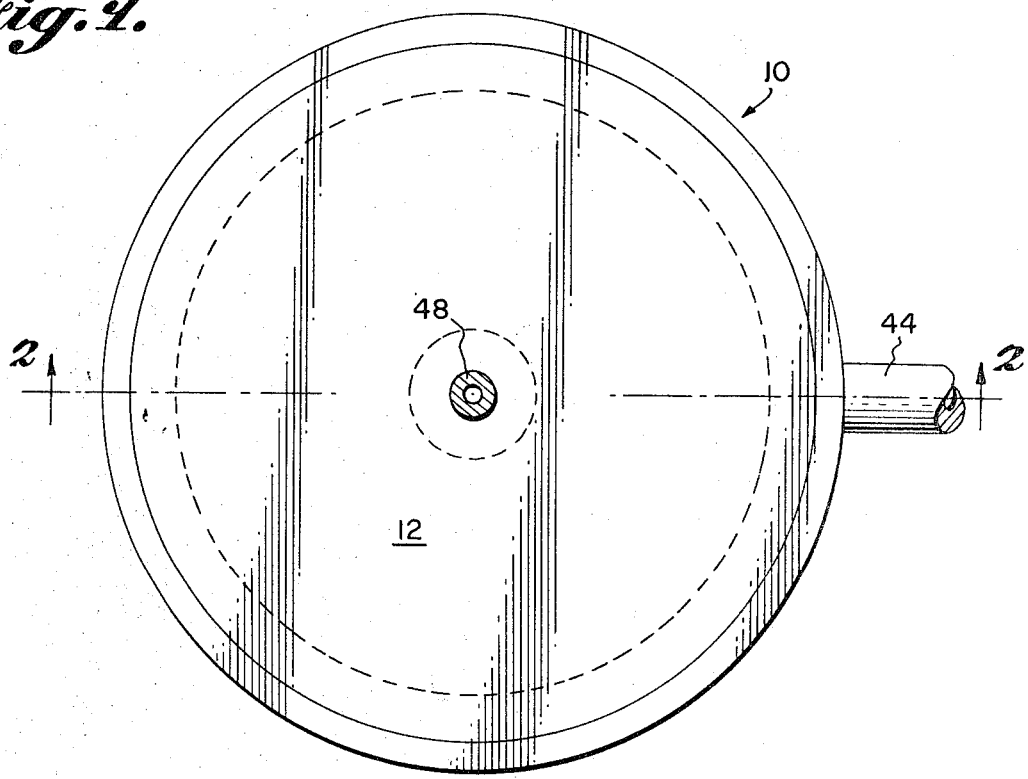
FIG. 1 is a top plan view showing the pressure regulator of the present invention.
Figure 2:
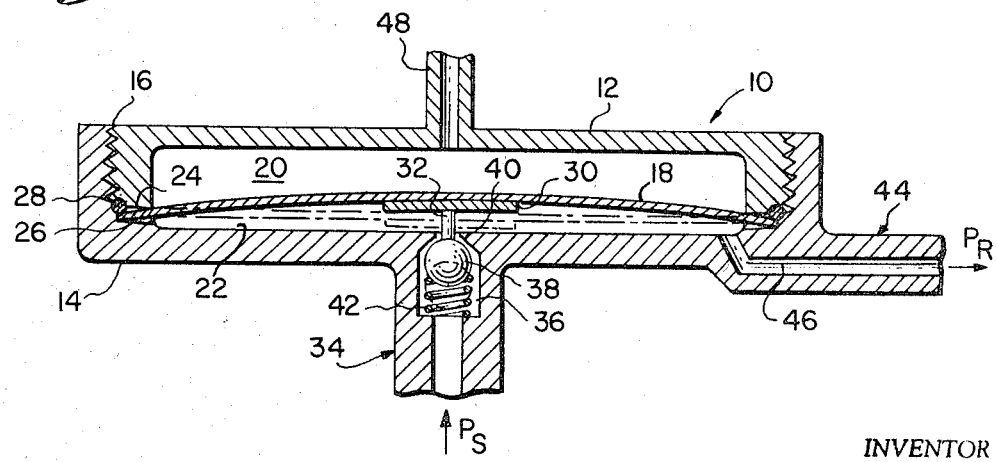
FIG. 2 is a cross-sectional view taken along line 2–2 of FIG. 1.

Referring specifically to FIGS. 1 and 2 of the drawings, the reference numeral 10 refers to the pressure regulator of the present invention which consists of an upper housing member 12 and a lower housing member 14, each having flanged portions extending from their edges. The outer surface of the flanged portion of the housing member 12 threadedly engages the inner surface of the flanged portion of the housing member 14, as shown at 16.

A diaphragm 18, having a predetermined flexural strength, has its outer rim portion clamped between an inclined shoulder 24 formed on the flanged portion of the upper housing member 12, and a corresponding inclined shoulder 26 formed on the lower housing member 14, the design being such that in its normal position, the diaphragm is bowed upwardly as shown by the solid lines in FIG. 2 so that it is preloaded in a downward direction. The magnitude of this latter load may be adjusted by simply rotating the upper and lower housing members 12 and 14 relative to each other to adjust their relative position in an axial direction. An O-ring seal 28 is provided between the upper and lower housing members 12 and 14 in the immediate vicinity of the clamped portion of the diaphragm 18, as shown.

The diaphragm 18 divides the space defined by the housing members into a pair of chambers 20 and 22, and a plate member 30 is fixed to the undersurface of diaphragm 18 in the central portion thereof, and carries a post 32 which extends downwardly into the chamber 22.

An inlet 34 is provided through the lower housing member 14, the central bore of the inlet being enlarged as shown at 36 to receive a ball valve 38 which is urged towards a tapered valve seat 40 by means of a spring 42. The post 32 engages the upper surface of the ball valve 38 to operatively connect the diaphragm and the ball valve. An outlet 44 is provided in the lower housing member 14 which has a passage 46 formed therein in communication with the chamber 22. An inlet 48 may also be provided in the upper housing member 12 for reasons that will be described in detail later.

In operation, the device is connected to a source of fluid at a pressure $P_s$, which pressure urges the ball valve upwardly in cavity 36 as the fluid flows through the inlet 34 until equilibrium is established between the force of this pressure plus the force of the pressure of the fluid in the chamber 22, and the force exerted by the diaphragm in response to its preloading. In other words, and with reference to FIG. 2, the conditions are such that the force exerted downwardly by the flexed diaphragm 18 is equal to the sum of the forces exerted upwardly by the supply pressure, $P_s$, and the pressure $P_r$ in the chamber 22, these equilibrium conditions being shown by the solid lines in FIG. 2. It is understood that the calibration of the downward force exerted by the diaphragm is made taking into consideration the upward force exerted by the spring 42, and in the interests of brevity, the latter force will be disregarded.

Upon a change in the pressure $P_s$ of the fluid flowing through the inlet 34, such as a reduction, for example, the ball valve will move to the position shown by the dotted lines in FIG. 2 due to the downward force exerted by the loaded diaphragm 18 and its connection with the ball valve via the post 32. This downward movement of the diaphragm reduces the flexure thereon and causes it to automatically develop a weaker flexural force.

By optimum design of the configuration of the diaphragm 18 (such as its thickness and diameter with respect to the size of the ball valve, etc.), this decrease in the pressure $P_s$ of the supply fluid can be offset by the decrease in the preloading, or the flexural force, of the diaphragm so that the pressure in the chamber $P_r$ will remain constant at equilibrium. Hence, the fluid will exit from the chamber 22 through passage 46 at substantially constant pressure.

In most applications, the body forces acting upon the regulator of the present invention as a result of acceleration will not be large enough to disturb its operation, mainly due to the low mass of the moving part involved. However, when the launch acceleration is very high, the regulator axis may be oriented orthogonally with respect to the launch direction to minimize effects of these large acceleration forces. In cases where the latter remedy is not sufficient to overcome these forces, a bias pressure can be emitted to the regulator at the inlet 48 which in turn may be controlled by any known means, such as a duplicate regulator whose axis is parallel but oriented 180 percent from the instant regulator. Also acceleration sensitive compensators could deliver a pressure at inlet 48 to compensate for these acceleration forces.

It is thus seen that the pressure regulator of the present invention is simple in operation and structure, has a minimum of moving parts and a reduced mass, and is not susceptible to the effects of high acceleration.

Of course, variations of the specific construction and arrangement of the fluidic pressure regulator disclosed above can be made by those skilled in the art without departing from the invention as defined in the appended claims.

I claim:
1. A pressure regulator comprising:
   a first hollow housing member having a first threaded portion;
   a second hollow housing member having a second threaded portion;
   said first threaded portion being connected to said second threaded portion;
   a chamber formed by said housing members;
   said first hollow housing member having an inlet passage to said chamber;
   a valve seat disposed in said inlet passage;
   said first hollow housing member having an outlet passage from said chamber;
   a disc plate disposed in said chamber;
   clamping means for loading said disc plate;
   said inlet passage having a ball valve disposed therein;
   connecting means connecting said ball valve to said disc plate; and
   said clamping means being arranged to apply an edge moment to said disc plate for preloading said disc plate so that said disc plate is responsive to the pressure in said chamber and is operative to move said ball valve in response to the pressure in said chamber.

2. A pressure regulator as claimed in claim 1 wherein said second hollow housing member has another means to introduce pressurized gas to provide an added biasing means on said regulator.